Figure 3B:
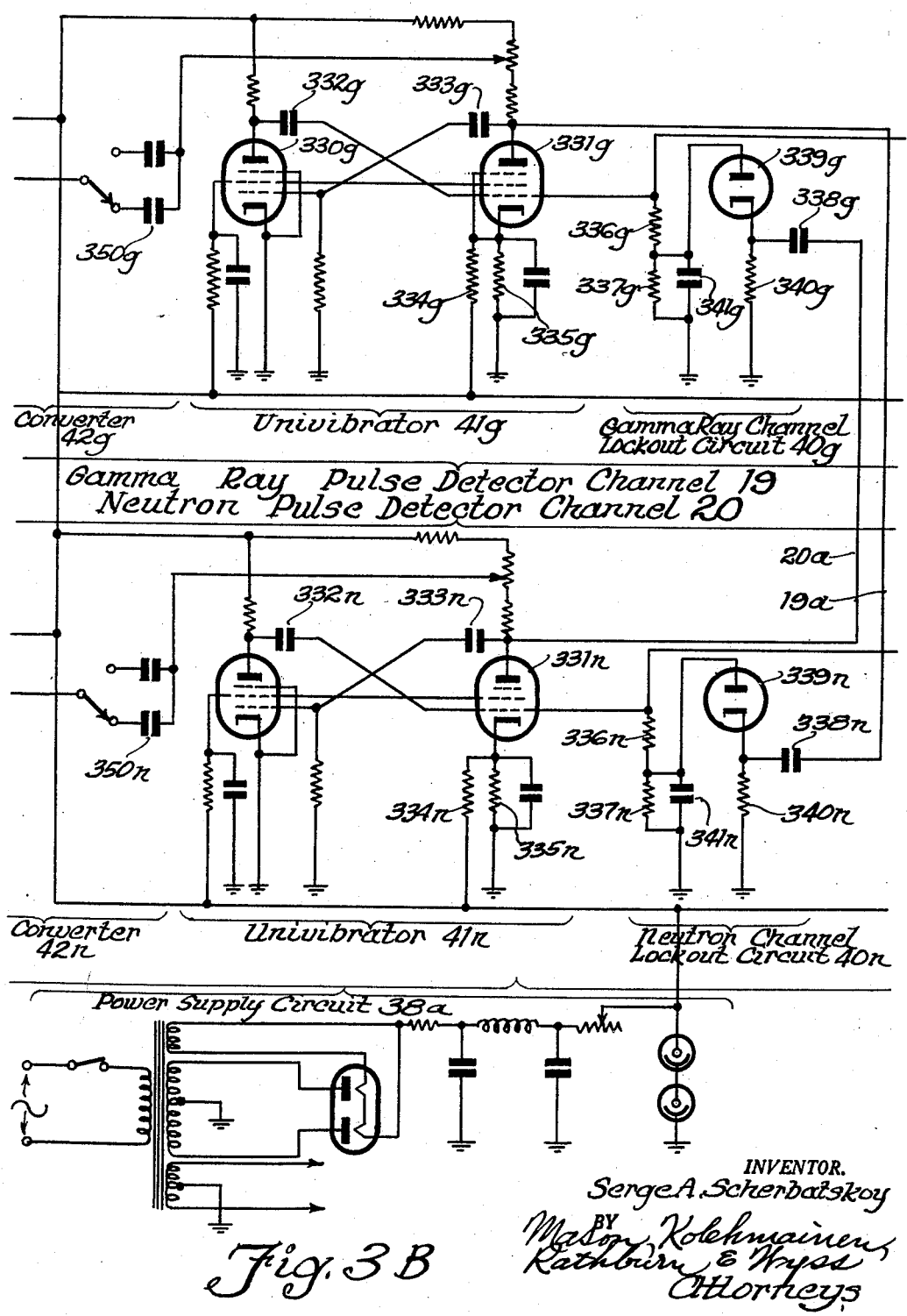

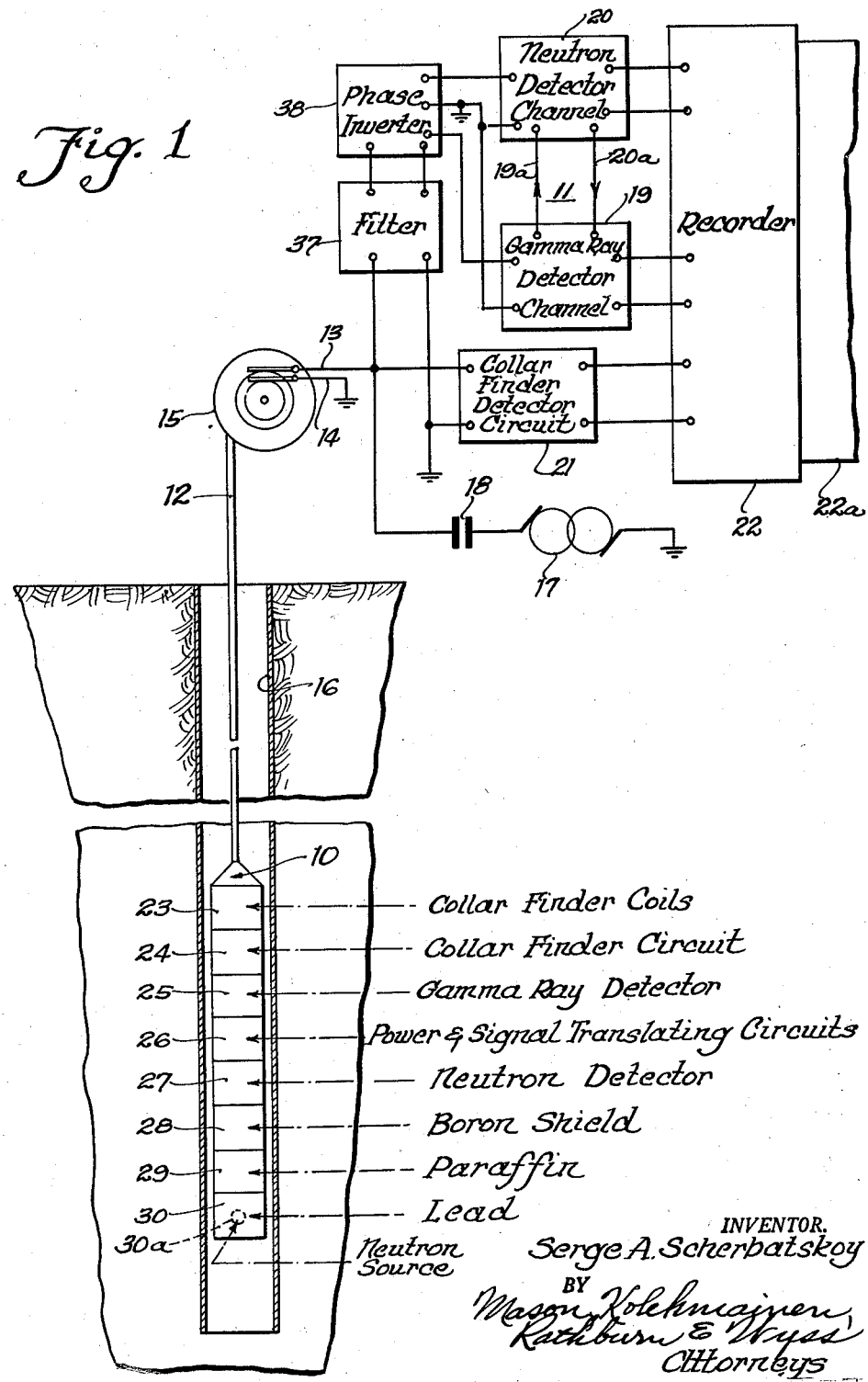

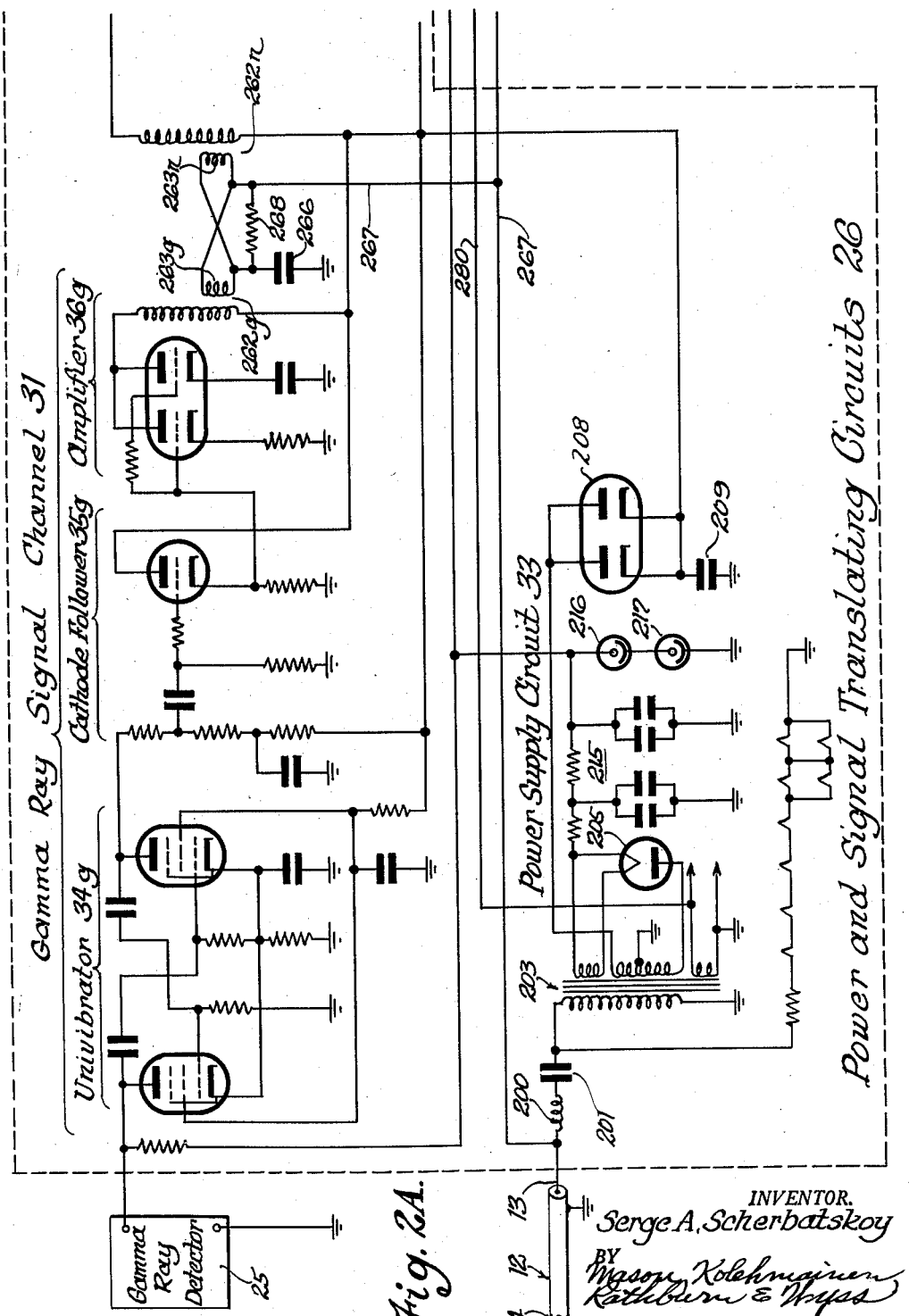

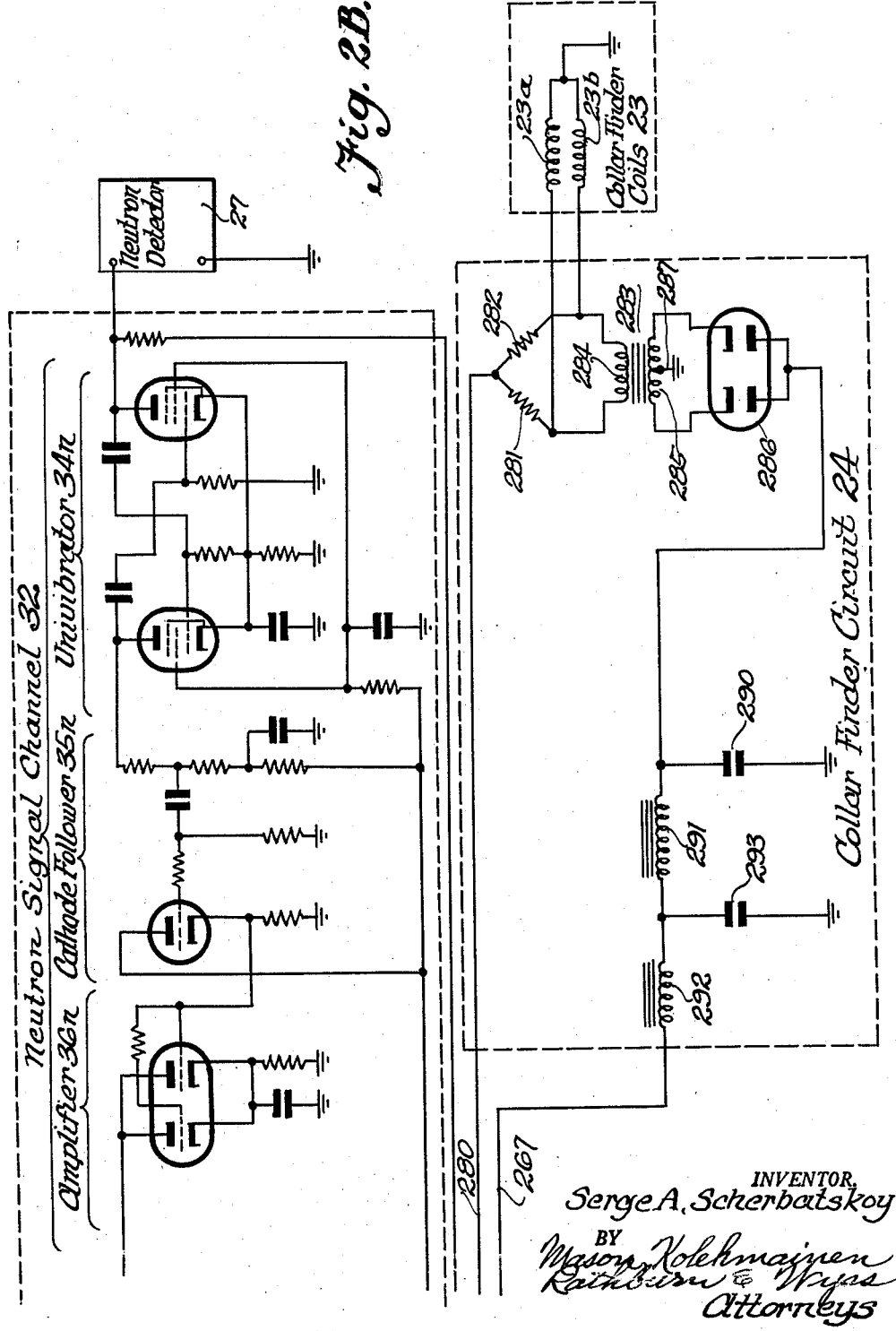

Nov. 3, 1959 S. A. SCHERBATSKOY 2,911,536
SIMULTANEOUS NEUTRON AND GAMMA RAY WELL LOGGING SYSTEM
Filed June 12, 1951 6 Sheets-Sheet 4
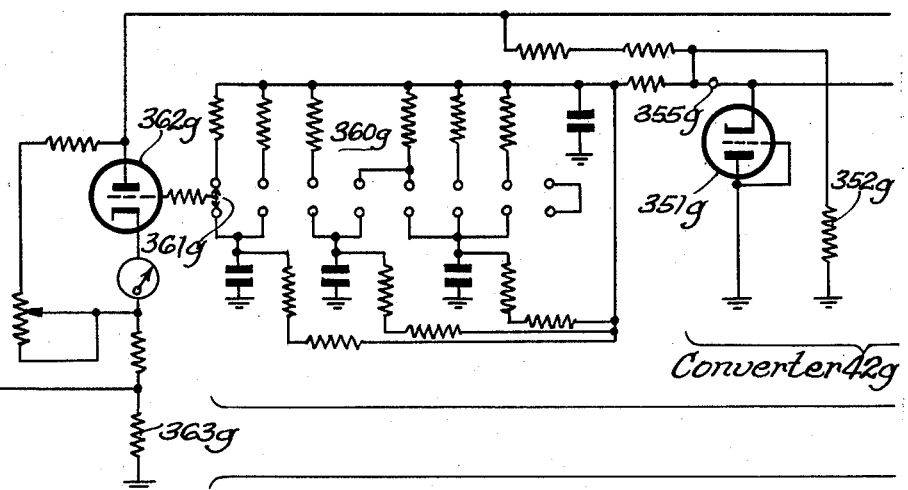
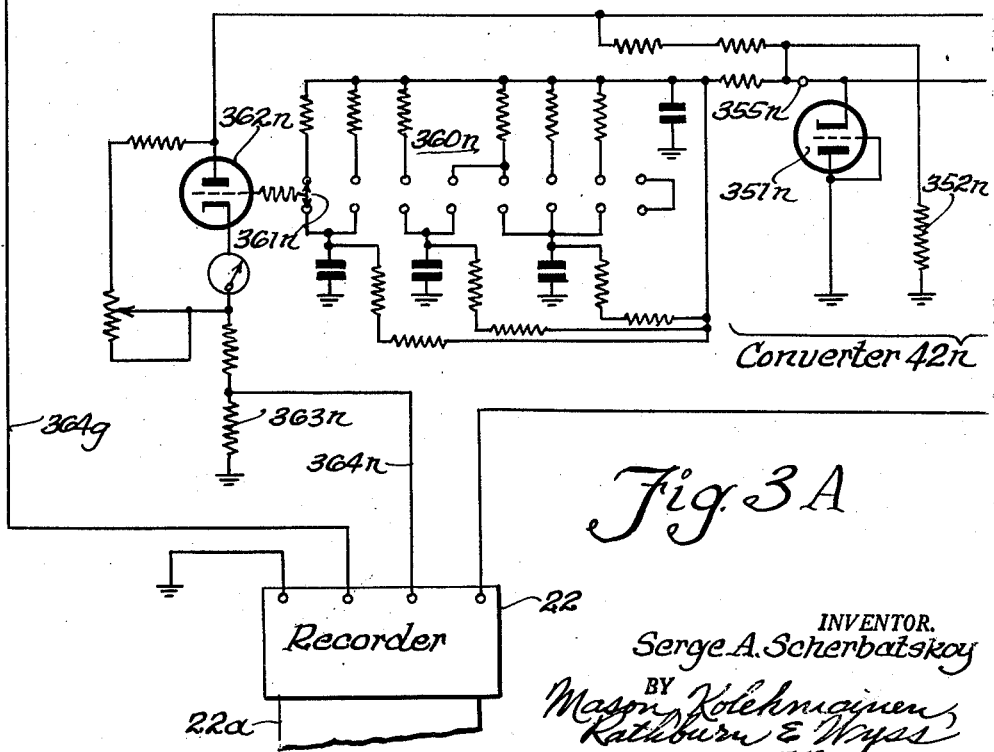
Fig. 3A
INVENTOR.
Serge A. Scherbatskoy
BY
Mason, Kolehmainen,
Rathburn & Wyss
Attorneys

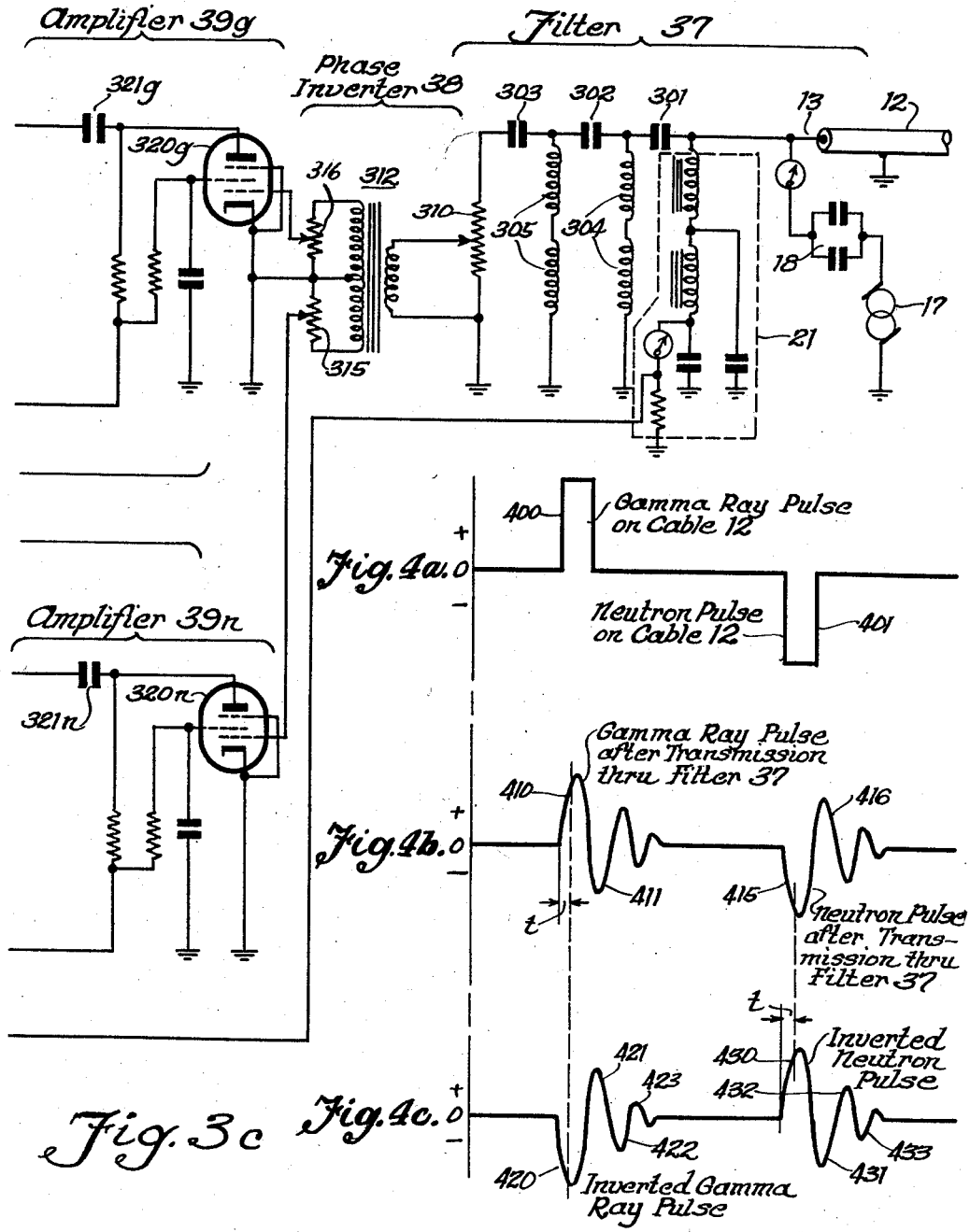

United States Patent Office 2,911,536
Patented Nov. 3, 1959

2,911,536
SIMULTANEOUS NEUTRON AND GAMMA RAY WELL LOGGING SYSTEM

Serge A. Scherbatskoy, Tulsa, Okla., assignor, by mesne assignments, to PGAC Development Company, Houston, Tex., a corporation of Texas Application June 12, 1951, Serial No. 231,111

18 Claims. (Cl. 250—83.6)

The present invention relates to a radioactivity well logging system, and more particularly to a well logging system for simultaneously obtaining a neutron log and a gamma ray log together with a correlated collar log. The invention has for an object the provision in a system of the character described of an improved method and apparatus for separating neutron pulses and gamma ray pulses at the earth's surface. Specifically, the present invention is a continuation-in-part of my co-pending application Serial No. 205,616 which was filed on January 12, 1951, which issued as U.S. Letters Patent No. 2,740,053 on March 27, 1956.

In the art of radioactivity well logging, several types of logging systems may be employed. One such system, which is described and claimed in my co-pending application identified above, comprises a simultaneous neutron and gamma ray well logging system wherein a simultaneous neutron and gamma ray log together with a collar position log is obtained while employing only a single conductor armored cable to raise and lower the apparatus, to supply power to the subsurface equipment and to transmit all of the logging information from the subsurface equipment to the surface equipment. This is accomplished by transmitting neutron pulses of one polarity and gamma ray pulses of the opposite polarity over the single conductor of the supporting cable to the earth's surface. Alternating current power is also transmitted over the supporting cable to the subsurface equipment and is isolated from the neutron and gamma ray pulse detector circuits by means of an input filter at the earth's surface. Collar position indication is obtained by transmitting unidirectional voltage deflections, or kicks, over the supporting cable to the surface equipment. At the earth's surface the neutron pulses, gamma ray pulses and collar position voltage deflections are separated from one another and are individually supplied to suitable recording means.

When a single conductor cable is used in the system described above to transmit neutron pulses of one polarity and gamma ray pulses of the opposite polarity to the surface equipment, it is necessary to pass these pulses of opposite polarity through an input filter network so as to remove the alternating current wave which is also transmitted over the supporting cable to energize the subsurface equipment. When the oppositely polarized neutron and gamma ray pulses are passed through an LC high pass filter, they shock excite the filter into oscillation at its natural resonant frequency. As a result, the pulses are transformed into damped oscillatory wave trains which have both positive and negative portions. However, the use of an input filter of this type is desirable from the standpoint of adequate separation of the neutron and gamma ray pulses from the relatively low frequency power wave for the reason that a sharper cut-off characteristic is obtainable with this type of filter and better noise rejection is provided. The separation of pulses of one polarity from pulses of the opposite polarity with an LC input filter thus becomes extremely difficult due to the fact that each pulse contains both positive and negative portions.

While the input filter may be designed so that it does not ring and will pass the positive gamma ray and negative neutron pulses substantially without change such an expedient is quite complicated and expensive and a large portion of the useable signal may be lost in transmission through such a filter. It would be desirable, therefore, to separate the pulse on some basis other than one of pure difference in polarity so that the separation would not be influenced by spurious oscillations or ringing caused by transmission through an input filter which, for other considerations, is desirable.

Accordingly, it is another object of the present invention to provide in a simultaneous neutron and gamma ray well logging system an improved method and apparatus for separating neutron pulses of one polarity from gamma ray pulses of the opposite polarity.

It is still another object of the present invention to provide in a simultaneous neutron and gamma ray well logging system an improved method and apparatus for separating neutron pulses of one polarity from gamma ray pulses of the opposite polarity wherein an LC input filter may be employed to separate the neutron and gamma ray pulses from the other signals of the well logging system.

A further object of the present invention resides in the provision in a simultaneous neutron and gamma ray well logging system of an improved method and apparatus for separating neutron pulses of one polarity from gamma ray pulses of the opposite polarity wherein oscillations due to ringing or the like do not interfere with separation of the pulses.

The invention, both as to its organization and method of operation, together with further objects and advantages thereof, will best be understood by reference to the following specification taken in connection with the accompanying drawings in which:

Fig. 1 diagrammatically illustrates a combined neutron, gamma ray and collar position logging system characterized by the features of the present invention;

Figs. 2A and 2B taken together schematically illustrate in detail a subsurface equipment which may be employed in the logging system of Fig. 1;

Figs. 3A, 3B and 3C when laid side by side in the order named, schematically illustrate the present improved surface equipment of the logging apparatus of Fig. 1 and;

Figs. 4(a)–4(c) inclusive, are graphic illustrations used to explain the operation of the surface equipment of Figs. 3A, 3B and 3C.

Referring now to the drawings and more particularly to Fig. 1 thereof, the simultaneous neutron, gamma ray and collar position logging apparatus there illustrated generally comprises a subsurface unit 10 and a surface unit 11 interconnected by means of a single conductor coaxial cable 12. The arrangement illustrated is particularly adapted for the production of simultaneous neutron and gamma ray logs of boreholes traversed by the subsurface unit 10.

In general, the subsurface equipment 10 comprises a pair of collar finder coils 23, a collar finder circuit 24, a gamma ray detector 25, power and signal translating circuits 26, a neutron detector 27, a boron shield 28, a paraffin spacer 29 and a mass of lead 30 within which is positioned a suitable neutron source 30a.

The component units 23—30 are all housed within a sealed housing having the requisite physical strength to withstand the fluid pressures encountered and are preferably located in the housing in the particular order illustrated. The unit 10 is arranged to be lowered into the borehole by means of the cable 12 which preferably is of the coaxial type and comprises a center conductor 13 surrounded by and insulated from an armored sheath 14. This sheath is appropriately grounded at the earth's surface and an alternating current generator 17, forming a part of the surface equipment 11 and coupled to the cable conductor 13 through the blocking condenser 18, is utilized to supply power over the cable 12 to the subsurface unit 10. As will be understood by those skilled in the art, the cable 12 extends into the borehole and is carried on a suitable power operated drum 15 located at the earth's surface. Conventional drive facilities may be provided for rotating the drum 15 in either direction, whereby the cable 12 may be fed into or reeled out of the borehole so as to move the subsurface equipment 10 longitudinally of the borehole. In the particular arrangement illustrated in Fig. 1, the borehole is lined with the usual ferrous metal casing 16 which is provided with collar coupling elements, not shown, along the length thereof. These elements have the effect of increasing the wall thickness of the casing at evenly spaced points along the length of the casing and hence serve as casing section markers.

Generally considered, the surface equipment 11 comprises a filter circuit 37, a phase inverter 38, a gamma ray pulse detector channel 19, a neutron pulse detector channel 20, a collar finder detector circuit 21 and a recorder 22 which may be of the commercial type known as the Speed-O-Max, manufactured by the Leeds and Northrop Company of Philadelphia, Pennsylvania. Specifically, the output circuits of the units 19, 20 and 21 are connected to the recording instrument 22 which operates to produce on the record strip 22a a continuous graph of both the neutron and gamma ray signals transmitted to the equipment 11 from the subsurface equipment 10. The recorder 22 also responds to the signals supplied by the detector circuit 21 to produce record indications on the strip 22a identifying the positions of the casing collars so that a correlated neutron, gamma ray and depth measurement log is obtained.

In accordance with the present invention, each of the channels 19 and 20 is provided with a disabling circuit or "lock out" circuit which is operated in response to the transmission of pulses through the opposite channel. Thus the gamma ray pulse detector channel 19 is provided with a lock out circuit 41g, shown in detail in Fig. 3B, which is controlled by means of a disabling pulse supplied from the neutron detector channel 20 over the conductor 20a. Likewise, the neutron detector channel 20 is provided with a lock out circuit 41n, shown in detail in Fig. 3B, which is controlled by means of a disabling pulse supplied from the gamma ray detector channel 19 over the conductor 19a.

Briefly, to consider the general mode of operation of the simultaneous logging system shown in Fig. 1 in relation to the present invention and without considering in detail the circuit arrangements of the units shown therein in block diagram form, neutrons which are emitted by the source 30a pass through the surrounding formation and are intercepted by the neutron detector 27 and cause ionization thereof. The neutron detector 27 is preferably in the form of a Geiger-Müller counter provided with a foil which becomes radioactive when bombarded by neutrons, and the counter produces pulses, the rate of occurrence of which is proportional to the intensity of the neutrons intercepted by the detector 27. Pulses which are produced in the neutron detector 27 are supplied to the power and signal translating circuits 26 wherein these pulses are amplified and are standardized in amplitude and width and are supplied as pulses of a predetermined polarity to the central conductor 13 of the cable 12 for transmission to the surface equipment 11. At the surface, the neutron pulses are passed through the filter circuit 37, wherein they are separated from the alternating current power wave supplied by the generator 17 and the unidirectional voltage deflections produced by the collar finder circuit 24. The neutron pulses, which are of predetermined polarity, are then transmitted through the phase inverter 38 and applied to the neutron detector channel wherein they are further amplified, standardized in amplitude and width and converted into a voltage having an amplitude proportional to the rate of occurrence of the neutron pulses. Coincident with the leading edge of each neutron pulse presented to the channel 20 there is also produced a disabling pulse which is supplied over the conductor 20a to the gamma ray detector channel 19 so as to disable the channel 19 and positively prevent the false response of the channel 19 to an incoming neutron pulse.

The gamma ray detector 25 is preferably of the Geiger-Müller counter type, and gamma rays which are intercepted by the detector 25 produce pulses in the output circuit thereof, the rate of occurrence of which is proportional to the intensity of the detected gamma rays. The pulses produced in the manner described above in the gamma ray detector 25 are supplied to the power and signal translating circuits 26 wherein the gamma ray detector pulses are amplified and standardized in amplitude and width and are then transmitted as pulses of the opposite polarity over the cable 12 to the surface equipment 11. At the surface, the gamma ray pulses are passed through the filter circuit 37, wherein they are separated from the alternating current power wave and the unidirectional collar finder voltage deflections and are supplied to the gamma ray detector channel 19. The gamma ray pulses are also passed through the phase inverter 38 and are supplied to the gamma ray detector channel 19 wherein they are further amplified and standardized in width and are converted into a voltage having an amplitude proportional to the rate of occurrence of the gamma ray pulses in the channel 19. Coincident with the leading edge of each of the gamma ray pulses presented to the channel 19 there is produced a disabling pulse which is supplied over the conductor 19a to the neutron detector channel 20. The disabling pulses supplied to the neutron detector channel 20 operate to disable this channel during the occurrence of each gamma ray pulse and positively present the false response of the neutron detector channel 20 to incoming gamma ray pulses.

In the subsurface unit 10, the collar finder apparatus comprises the finder coils 23 and the collar finder circuit 24. The collar finder coils 23 are included in a bridge circuit which is balanced when the coils are located adjacent a ferrous metal casing or pipe of uniform wall thickness. As the coils move past a casing collar, however, one of the coils is influenced by the collar before the other coil, and there is thus produced a momentary unbalance of the impedances of the two coils. As a consequence, a unidirectional voltage deflection, or kick, is produced each time the unit 10 traverses a casing collar and these voltage kicks are supplied over the conductor 13 to the surface equipment 11. The unidirectional collar finder kicks are separated from the other signals present on the cable conductor 13 in the collar finder detector circuit 21 and are supplied to the recorder 22. There is thus produced simultaneously with the gamma ray and neutron logs on the record strip 22a a correlated collar position log so as to provide correlated depth measurement.

Subsurface unit 10

While the present invention provides a method and apparatus for separating neutron pulses of one polarity from gamma ray pulses of the opposite polarity which is of general utility in simultaneous neutron and gamma ray well logging systems, the invention is particularly suitable for use in connection with a subsurface unit of the type shown in detail in Figs. 2A and 2B. For a complete and detailed description of the subsurface unit 10, reference may be had to my copending application Serial No. 205,616, referred to above. However, for the purposes of the present invention it may be stated that the subsurface unit 10 performs the functions of supplying correlated neutron, gamma ray and collar position signals over the conductor 13 to the surface equipment 11 as the subsurface unit 10 is moved longitudinally of the borehole. The power and signal translating circuit 26 of the subsurface unit 10 comprises a power supply circuit 33, a gamma ray signal channel 31 and a neutron signal channel 32. The gamma ray signal channel 31 receives pulses from the gamma ray detector 25 in response to gamma rays intercepted by the detector 25. The neutron signal channel 32 is substantially identical to the gamma ray signal channel 31 and receives pulses from the neutron detector 27 in response to neutrons intercepted by the detector 27. The power supply circuit receives alternating current power from the generator 17 over the cable 12 and provides a unidirectional supply voltage which is suitable for energizing the vacuum tubes of the gamma ray signal channel 31 and the neutron signal channel 32.

Pulses produced by the gamma ray detector 25 in response to gamma rays impinging upon this detector are standardized in amplitude and width by means of the univibrator 34g and are further amplified in the amplifier 36g so as to provide across the secondary winding 263g of the coupling transformer 262g sharp pulses of a given polarity, i.e. positive with respect to ground. These pulses are superimposed upon the alternating current wave of the generator 17 which may be a 400 cycle generator and are transmitted over the cable 12 to the surface equipment 11. In an identical manner, the pulses produced by the neutron detector 27 in response to neutrons impinging upon the detector are standardized in amplitude and width in the univibrator 34n, and are amplified in the amplifier 36n. However, in order to distinguish the gamma ray pulses, which are produced across the output winding 263g and supplied over the conductor 267 to the cable 12 with a given polarity, from the neutron pulses produced across the secondary winding 263n of the neutron channel output transformer 262n, the winding 263n is connected across the common damping network including the resistor 268 and the condenser 266 with the opposite polarity so as to produce neutron pulses having a polarity opposite from the gamma ray pulses on the common conductor 267, i.e. pulses which are negative with respect to ground. The provision of a common line coupling condenser 266 and a common damping resistor 268 for both the gamma ray signal channel 31 and the neutron signal channel 32 serves the important function of substantially preventing ringing in the common output circuit for the channels 31 and 32. In this connection it will be understood that the resistor 268 is of very low value and preferably has a resistance of the order of 27 ohms, in order to prevent the inductive windings 263g and 263n, which are coupled together, from self-oscillating and producing disturbing ringing transients which would interfere with the oppositely polarized gamma ray and neutron pulses supplied to the common conductor 267.

In order to produce correlated indications of the depth to which the subsurface unit 10 is lowered, the collar finder circuit 24 is provided. This circuit is arranged to be energized from the power supply circuit 33 and functions to supply unidirectional voltage deflections, or kicks, over the cable 12 to the collar finder detector circuit 21 at the surface. In this circuit the resistors 281 and 282 and the collar finder coils 23a and 23b comprise a bridge circuit and if the impedances of the collar finder coils 23a and 23b are equal, the bridge is balanced and no voltage is produced across the primary winding 284 of the coupling transformer 283. The above-described situation obtains when the coils 23a and 23b are located adjacent a ferrous metal casing or pipe of uniform wall thickness. However, as the coils are moved past a casing collar, one of the coils 23a or 23b is influenced by the collar before the other coil, and a momentary unbalance of the impedances of the two coils is produced. As a consequence, a voltage is produced across the primary winding 284 which is rectified by the rectifiers 286 so as to provide a unidirectional voltage which is supplied over the cable 12 to the surface equipment 11. In this connection, it will be understood that the unidirectional voltage deflections, or kicks, which are produced by the collar finder circuit 24 are isolated from the alternating current power supply circuit by means of the condensers 201 and 18. It will also be understood that the collar finder voltage kicks are superimposed upon the other signals present on the cable conductor 13, so that the overall waveform of the voltage between the inner cable conductor 13 and the grounded outer sheath of the cable comprises a 400 cycle alternating current power wave which is used to energize the power supply circuit 33, gamma ray pulses of positive polarity which are superimposed upon the 400 cycle wave, neutron pulses of negative polarity which are also superimposed upon the 400 cycle wave and the collar finder unidirectional voltage kicks, or deflections, which comprise a relatively slow increase and decrease of the unidirectional potential on the conductor 13.

Alternating current from the surface generator 17 is transmitted through the condenser 18, the cable conductor 13 and the series connected choke coil 200, and condenser 201 to the primary winding of a power transformer 203, the other end of the primary winding being connected to ground so as to complete the circuit through the grounded sheath of the cable 12. The output of a high voltage rectifier tube 205 is filtered in a two section R-C filter indicated generally at 215 and regulated by means of the series connected gaseous regulator tubes 216 and 217 to provide a rectified and filtered high voltage for exciting the gamma ray detector 25 and the neutron detector 27. Likewise, a rectified and filtered low voltage is produced across the condenser 209 and is utilized as an anode supply potential for the vacuum tubes of the signal channels 31 and 32. Preferably, a choke coil 200 is connected in series with the condenser 201 between the cable conductor 13 and the primary winding of the power transformer 203. This choke coil effectively prevents harmonics which may be generated by the rectifiers 205 and 208 from being coupled back through the power transformer 203 and impressed upon the cable 12 so that harmonics of the power supply frequency are not intermingled with the signals of the logging system.

*Surface equipment 11*

Referring now more particularly to the portion of the system of Fig. 1 embodying the features of the present invention there is illustrated in Figs. 3A, 3B and 3C the present improved surface equipment 11. In general, the surface equipment 11 comprises a gamma ray pulse detector channel 19, a neutron pulse detector channel 20, a collar finder detector circuit 21, a recording instrument 22, an input filter circuit 37, a phase inverter circuit 38, and a power supply circuit 38a. The gamma ray pulse detector channel 19 is substantially identical with the neutron pulse detector channel 20 and corresponding elements of the channels 19 and 20 have been identified by the same reference numerals distinguished by the reference letters "g" and "n" respectively.

The input filter 37 is provided for the purpose of separating the gamma ray pulses and neutron pulses, impressed on the cable 12, from the 400 cycle power frequency components and the substantially unidirectional voltage deflections produced by the collar finder circuit 24. In the illustrated embodiment, the filter circuit 37 is in the form of a plural section inductance-capacitance high pass filter and includes the series connected condensers 301, 302 and 303 and the shunt connected inductances 304 and 305. An LC filter of this type has the advantage of providing a sharp cut-off characteristic so as to filter out the 400 cycle power components while permitting the transmission therethrough of pulse wave forms having relatively low frequency components. However, when such an LC filter is employed, self oscillation or ringing may result so that the pulses transmitted therethrough become a series of damped oscillatory wave trains having alternate positive and negative half cycles. A potentiometer 310 is provided in the output circuit of the filter 37 so as to select a desired portion of the filtered gamma ray and neutron pulses transmitted therethrough.

The output from the filter circuit 37 is supplied to a phase inverter 38 which in the illustrated embodiment, is in the form of a phase inverter transformer 312 having the primary winding thereof connected to the output of the filter circuit 37. A pair of series connected potentiometers 315 and 316 are connected in series across the secondary winding of the transformer 312 and the junction point between the potentiometers 315 and 316 is connected to ground. The phase inverter transformer 312 operates to supply a push pull output from the filter circuit 37 and pulses of one phase are supplied from the transformer 312 to the gamma ray pulse detector channel 19 whereas pulses of the opposite phase are supplied from the transformer 312 to the neutron pulse detector channel 20. Thus, gamma ray pulses which are impressed with positive polarity across the primary winding of the transformer 312 are inverted in this transformer and appear as pulses which are negative with respect to ground across the potentiometer 316 and appear as pulses which are positive with respect to ground across the potentiometer 315. On the other hand, neutron pulses which are impressed as negative pulses across the primary winding of the phase inverter transformer 312 appear as pulses which are positive with respect to ground across the potentiometer 316 and as pulses which are negative with respect to ground across the potentiometer 315.

The negative gamma ray pulses which are produced across the potentiometer 316 in the manner described above, are supplied to the control grid of an amplifier tube 320g in the gamma ray pulse detector channel 19, the cathode of the tube 320g being connected to ground. The gamma ray pulse is repeated as a positive pulse in the anode circuit of the tube 320g and is coupled through the condenser 321g to the input circuit of a univibrator 41g. The univibrator 41g comprises the tubes 330g and 331g which are connected as a one shot multi-vibrator. Thus, the tube 331g is biased beyond anode current cut-off by means of the voltage divider network including the resistors 334g and 335g. Due to the fact that the tube 331g is normally nonconductive, the univibrator is insensitive to negative pulses supplied thereto and is only triggered by positive pulses which are supplied to the control grid of the tube 331g from the amplifier tube 320g.

Each time an amplified gamma ray pulse of positive polarity, and representative of a detected gamma ray, is supplied to the control grid of the tube 331g, the tube 331g is rendered conductive and the tube 330g is rendered non-conductive for an interval determined by the time constant of the controlling grid circuit. As a consequence, negative pulses of uniform amplitude and width are produced in the anode circuit of the tube 331g at the rate of one such pulse for each positive gamma ray pulse delivered to the univibrator 41g from the amplifier tube 320g. It will be recalled that the neutron pulses are transmitted over the cable 12 as pulses which are negative with respect to ground, and if these pulses are not modified in the filter circuit 37, the neutron pulses are not of the proper polarity to cause conduction of the tube 331g and the univibrator 41g does not respond to these pulses.

The negative pulses produced in the anode circuit of the univibrator 41g are supplied to the converter 42g which performs the function of providing an output wave the amplitude of which varies in accordance with the rate of occurrence of the pulses developed by the univibrator 41g and hence of the intensity of the gamma rays intercepted by the gamma ray detector 25. More specifically, the negative univibrator pulses from the univibrator 41g are supplied through a small condenser 350g to the cathode of a shunt rectifier 351g in the form of a diode which is paralleled by the resistor 352g. In the converter 42g the condenser 350g is charged through the rectifier 351g during the negative portions of the univibrator pulses and during off pulse periods the condenser 350g discharges through the series path including the anode resistors of the tube 331g and the resistor 352g.

If the univibrator pulses, which coincide in time with the gamma ray detector pulses transmitted from the subsurface unit 10, are relatively far apart, the condenser 350g will discharge through the associated series path resistance so that the voltage at the output terminal 355g falls to a minimum value before the next pulse. Under these conditions the average value of the pulse wave form has a minimum value. If, however, the rate of occurrence of the univibrator pulses increases the average value of the wave form produced at the output terminal 355g will increase in direct proportion to the frequency of occurrence of these pulses.

The output from the converter 42g is supplied to an integrating circuit 43g wherein the high frequency components of the univibrator are removed. More specifically, the output from the converter 42g is filtered in a plural section filter network indicated generally at 360g and the output thereof is supplied to the control grid of a metering tube 362g. The smoothing action of the integrating circuit 43g may be varied by means of the step selector switch 361g which is employed to select the optimum value for the second filter section to provide adequate smoothing of the high frequency components while reducing the average value of the output wave by a minimum amount. The filtered output wave is repeated across the cathode resistor 363g of the tube 362g and is supplied over the conductor 364g to a low impedance input circuit of the recorder 22.

In a manner entirely similar to that discussed above, the neutron pulse detector channel 20 operates to select neutron pulses of predetermined polarity and to derive therefrom an output wave having an average value which is proportional to the rate of occurrence of the neutron pulses.

In the foregoing description of the operation of the channels 19 and 20 it has been assumed that the polarity of the gamma ray and neutron pulses is not effected by transmission through the filter 37 and that both the gamma ray and neutron pulses maintain their predetermined relative polarities so as to trigger the univibrators 41g and 41n in the manner described above. However, as stated heretofore in connection with the filter circuit 37, the provision of an LC filter of the type described produces transient oscillations or ringing so that both the gamma ray and neutron pulses are transformed into damped oscillatory wave trains having successive half cycle portions of opposite polarity. Thus, a positive gamma ray pulse which is transmitted through the filter 37 appears in the output circuit thereof as a damped wave train having an initial positive half cycle followed by successive half cycles of opposite polarity, the wave train finally dying down to zero amplitude. Likewise, a negative neutron pulse, when transmitted through the filter 37 appears in the output circuit thereof as a damped wave train comprising a first negative half cycle which is followed by a positive half cycle of smaller amplitude, the wave train again decaying to zero amplitude. As a result, the second half cycle of a modified neutron pulse is of the same polarity as a gamma ray pulse and, unless otherwise prevented, the positive portions of the neutron pulses would cause a false triggering of the univibrator 41g in the gamma ray pulse detector channel 19. Likewise, the second half cycle of the gamma ray pulses, which is of negative polarity, would interfere with the correct response of the neutron pulse detector channel 20 which is designed to respond to negative neutron pulses.

In order to prevent the above-described false triggering of the channels 19 and 20 by the transient, or overshoot portions of the gamma ray and neutron pulses, there is provided in accordance with the present invention a lock out circuit associated with each of the channels 19 and 20 which prevents either channel from responding to pulses designed to be accepted by the other channel. Thus, in the gamma ray pulse detector channel 19, there is provided a gamma ray channel lock out circuit 40g which is controlled by disabling pulses which are supplied over the conductor 20a from the univibrator 41n in the neutron pulse detector channel 20. More specifically, the negative univibrator pulses, which are produced at the anode of the tube 331n in the neutron detector channel 20 upon the occurrence of each neutron pulse supplied thereto, are supplied over the conductor 20a and through the condenser 338g to the cathode of a diode rectifier 339g. The cathode of the rectifier 339g is also connected to ground through the resistor 340g. The control grid of the univibrator tube 331g is connected through the series resistors 336g and 337g to ground potential and a condenser 341g is connected across the lower resistor 337g. The anode of the rectifier 339g is connected to the junction point of the resistors 336g and 337g.

Considering now the operation of the above-described gamma ray channel lock out circuit 40g, neutron pulses are amplified in the amplifier 39n and are coupled through the condenser 321n to the control grid of the tube 331n as positive pulses so as to trigger the univibrator 41n. There is thus produced in the anode circuit of the tube 331n a negative pulse coincident with each neutron pulse supplied to the channel 20. These negative neutron univibrator pulses produced in the anode circuit of the tube 331n are coupled through the condenser 338g to the cathode of the rectifier 339g and cause this rectifier to conduct. When the rectifier 339g conducts, the condenser 341g is charged negatively so as to produce a voltage thereacross which is negative with respect to ground, the condenser 341g being charged for a period equal to the duration of the disabling pulse from the univibrator 41n. The condenser 341g is charged to such a potential that the tube 331g is biased substantially beyond cut-off and the positive portions of the neutron pulses, which are passed by the amplifier 320g and are coupled to the control grid of the tube 331g, are ineffective to cause false triggering of the univibrator 41g. As a result, the univibrator 41g is completely blocked against the false triggering thereof by the positive portions of the neutron pulses which are present in the anode circuit of the tube 320g in the gamma ray pulse detector channel 19.

The condenser 341g discharges through the shunt resistor 337g and after an interval of time determined by the time constant of the resistor 337g and the condenser 341g, the control grid potential of the tube 331g is made sufficiently positive to enable triggering of the univibrator 41g by subsequent positive pulses. The univibrator 41g is thus disabled by means of the gamma ray channel lock out circuit 40g upon the passage of each neutron pulse through the neutron pulse detector channel 20, the univibrator 41g being disabled for a period of time sufficient to prevent triggering thereof by any one of the positive half cycles of the damped neutron pulse wave train.

In a manner entirely similar to that discussed above, the neutron pulse detector 20 is provided with a neutron channel lock out circuit 40n. The neutron channel lock out circuit 40n is substantially identical to the gamma ray channel lock out circuit 40g and disabling pulses from the gamma ray univibrator 41g are supplied over the conductor 19a to the lock out circuit 40n so as to block the univibrator 41n upon the occurrence of each gamma ray univibrator pulse and positively prevent the univibrator 41n from falsely responding to gamma ray pulses.

In order to visualize more clearly the operation of the above-described gamma ray and neutron pulse separation system, there is illustrated in Figs. 4(a) to 4(c) inclusive, certain of the wave forms which are present at various points in the system. Referring to Fig. 4(a), there is shown in this figure a typical gamma ray pulse 400 which is transmitted over the cable 12 to the filter 37 and a typical neutron pulse 401 which is also transmitted over the cable 12 to the filter 37. It is evident that the pulse 400 is of positive polarity with respect to the base line of the wave form and that the neutron pulse 401 is of a negative polarity. In this connection, it will be understood that the wave form on the cable 12 additionally comprises a 400 cycle power wave and the collar position voltage deflections which have been omitted for convenience of illustration in Fig. 4(a).

In Fig. 4(b) there is illustrated the gamma ray and neutron pulses as they appear after transmission through the filter 37. Thus, the gamma ray pulse 400 is transformed into a damped oscillatory wave train having a positive going first half cycle 410 which is followed by a negative half cycle 411 and the wave train decays to zero amplitude. In a similar manner, the neutron pulse 401 is transformed into a damped oscillatory wave train having an initial negative half cycle 415 which is followed by a positive half cycle portion 416 and the wave train again decays to zero amplitude.

In the phase inverter transformer 312, the gamma ray and neutron pulses are inverted and appear substantially as shown in Fig. 4(c). Referring to this figure, the gamma ray pulse, which is transformed in the filter 37 into a damped oscillatory wave train, is inverted and comprises a first negative half cycle 420 which is followed by successive half cycles 421, 422 and 423. In this connection it will be understood that the inverted gamma ray pulse of Fig. 4(c) is the mirror image of the gamma ray pulse shown in Fig. 4(b). In the same manner, the neutron pulses are inverted so as to comprise a first positive half cycle 430 which is followed by successive negative and positive half cycles 431, 432 and 433. It will again be understood that the inverted neutron pulse of Fig. 4(c) is the mirror image of the neutron pulse shown in Fig. 4(b).

Considering now the operation of the gamma ray pulse detector channel 19 and the neutron pulse detector channel 20 when the wave forms of Figs. 4(b) and 4(c) are applied thereto, it is evident that the first positive half cycle 410 of the gamma ray pulse shown in Fig. 4(b) will trigger the univibrator 41g of this channel and produce a corresponding negative univibrator pulse which is converted in the converter 42g and applied to the recorder 22. However, the gamma ray pulse also comprises a negative portion 411 which when inverted in the transformer 312 becomes the positive portion 421 shown in Fig. 4(c). The univibrator 41n, in the neutron channel 20, is also responsive to positive pulses and it will be seen that the positive going portion 421 of the inverted gamma ray pulse is of the correct polarity to trigger the neutron univibrator 41n and cause a false response in the neutron detector channel 20. However, in accordance with the present invention, the condenser 341n in the neutron channel lock out circuit 40n is charged negatively by means of a gamma ray univibrator pulse supplied through the condenser 338n and the diode 339n. The condenser 341n is charged at such a rate that within a short interval of time, indicated at "t" in Fig. 4(b), after the start of the gamma ray pulse the condenser 341n has acquired a substantial voltage thereacross. As a result, the univibrator 41n is biased so far beyond cut-off that the positive portion 421 of the inverted gamma ray pulse which occurs after the interval "t," is ineffective to trigger the univibrator 41n and a false response is prevented. Also, subsequent positive portions of the gamma ray pulse, such as the positive half cycle 423 are ineffective to trigger the neutron univibrator 41n due to the above-described action of the neutron channel lock out circuit 40n.

In a manner entirely similar to that discussed above, the neutron pulse detector channel responds to the first half cycle 415 of the neutron pulse and the univibrator 41n is triggered by the initial portion 415 of the neutron pulse so as to produce negative neutron univibrator pulses coincident with the leading edge of the neutron pulses. In this connection, it will be understood that the neutron pulse shown in Fig. 4(b) is inverted in the amplifier tube 320n so that the portion 415 thereof is of positive polarity and operates to trigger the univibrator 41n.

The neutron pulse is inverted so as to appear substantially as shown in Fig. 4(c) and appears across the potentiometer 316 together with the gamma ray pulse of this figure. It is evident from an inspection of Fig. 4(c) that the inverted neutron pulse includes a negative portion 431, which, when inverted in the amplifier tube 320g, is of the proper polarity to trigger the univibrator 41g. However, the gamma ray channel lock out circuit 40g, which is controlled by neutron univibrator pulses which are produced substantially coincident with the leading edge 415 of the neutron pulse (Fig. 4(b)), disables the gamma ray univibrator 41g so that it cannot accept the undesired portions 431 and 433 of the inverted neutron pulses. The gamma ray univibrator 41g is thus positively prevented from falsely responding to any neutron pulse.

While there has been described what is at present considered to be the preferred embodiment of the present invention, it will be understood that various modifications may be made therein which are within the true spirit and scope of the invention as defined in the appended claims.

What is claimed as new and desired to be secured by Letters Patent of the United States is:

1. In a simultaneous well logging system, means for separating radiation signals of one type from radiation signals of a different type, comprising means for supplying both types of signals to first and second signal selector channels, means for controlling the selection of signals in each of said channels in accordance with the initial portion of only one type of signal, and means for disabling each of said channels in response to signal selection in the opposite channel.

2. In a simultaneous well logging system of the type employing a subsurface unit adapted to transmit first radiation signals and second radiation signals to the earth's surface, means for separating and detecting said first and second radiation signals, comprising means for supplying both said first and second signals to first and second detector channels, means for controlling the detection of signals in each of said channels in accordance with the initial portion of only one type of signals, and means for disabling each of said channels in response to each signal detection in the opposite channel.

3. In a simultaneous well logging system of the type employing a subsurface unit adapted to transmit first radiation signals and second radiation signals to the earth's surface, means for separating and detecting said first and second radiation signals, comprising means for supplying both said first and second signals to first and second detector channels, means for controlling the detection of signals in each of said channels in accordance with the initial portion of only one type of signals, and means for disabling each of said channels for a predetermined interval of time in response to each signal detection in the opposite channel.

4. In a simultaneous well logging system of the type employing a subsurface unit adapted to transmit first radiation pulses or one type and second radiation pulses of a different type to the earth's surface, means for separating said first radiation pulses from said second radiation pulses, comprising means for supplying both said first and second pulses to first and second pulse selection channels, means for controlling the selection of pulses in each of said channels in accordance with the initial portion of only one type of pulse, and means for disabling each of said channels in response to selection of each pulse in the opposite channel.

5. In a simultaneous well logging system of the type employing a subsurface unit adapted to transmit first radiation pulses of one type and second radiation pulses of a different type to the earth's surface, means for separating said first radiation pulses from said second radiation pulses, comprising means for supplying both said first and second pulses to first and second pulse selection channels, means for controlling the selection of pulses in each of said channels in accordance with the initial portion of only one type of pulse, and means for blocking each of said channels for a predetermined interval of time in response to selection of pulses in the opposite channel.

6. In a simultaneous well logging system of the type employing a subsurface unit adapted to transmit first radiation pulses of a given polarity and second radiation pulses of the opposite polarity to the earth's surface, means for separating and detecting said first radiation pulses and said second radiation pulses, comprising means for supplying both said first and second radiation pulses to first and second pulse detector channels, means for controlling the detection of pulses in each of said channels in accordance with the initial portion of only one type of pulse, and means for disabling each of said channels in response to pulse detection in the opposite channel.

7. In a simultaneous well logging system, means for separating first radiation pulses having a first portion of one polarity followed by a second portion of the opposite polarity from second radiation pulses having a first portion of said opposite polarity followed by a second portion of said one polarity, comprising means for supplying both said first and second radiation pulses to first and second pulse detector channels, means for controlling the selection of pulses in each of said channels in accordance with the first portion of only one type of pulse, and means for preventing the selection in each of said channels of the second portion of both types of pulses.

8. In a simultaneous well logging system, means for separating first radiation pulses of one polarity from second radiation pulses of the opposite polarity, each of said pulses having overshoot portions extending beyond the baseline thereof comprising means for supplying both said first and second radiation pulses to a pair of pulse selector channels, means for controlling the selection of pulses in each of said channels in accordance with different types of said pulses, and means for preventing the overshoot portions of both types of pulses from producing a false response in each of said channels.

9. In a simultaneous well logging system of the type employing a subsurface unit adapted to transmit first radiation pulses of one polarity and second radiation pulses of the opposite polarity to the earth's surface and having a relatively low frequency power wave on which said first and second radiation pulses are superimposed, means for separating at the earth's surface said first radiation pulses and said second radiation pulses from said power wave and from each other, comprising means for passing said pulses through a high pass filter having a sharp cut-off characteristic to remove said power wave while passing the low frequency components of said pulses therethrough, each of said pulses being converted by transmission through said filter into a damped transient having a leading edge portion corresponding to the original polarity of the pulse, means for supplying both types of damped transients to a pair of selector channels, means for controlling the selection of transients in each of said channels in accordance with only the leading edge portions of different types of pulses, and means for preventing the selection in either of said channels of the remaining portions of said damped transients.

10. In a simultaneous well logging system of the type having a subsurface unit adapted to transmit first radiation pulses of a given polarity and second radiation pulses of the opposite polarity to the earth's surface, a first radiation detector channel for selecting pulses of said given polarity, and a second radiation detector channel for selecting pulses of said opposite polarity, means for preventing either of said channels from falsely responding to pulses transmitted through the other channel, comprising means for deriving control pulses in response to the leading edge portions of pulses transmitted through one of said channels, and means for disabling said other channel in response to said control pulses.

11. In a simultaneous well logging system of the type employing a subsurface unit adapted to transmit first radiation pulses of a given polarity and second radiation pulses of the opposite polarity to the earth's surface and having surface equipment including a first radiation pulse detector channel adapted to respond to pulses of one polarity and a second radiation pulse detector channel adapted to respond to pulses of the other polarity, means for preventing either of said detector channels from falsely responding to pulses of the wrong polarity, comprising means for deriving in each channel control pulses from the leading edge portions of pulses to which the channel responds, and means for controlling at least in part the transmission of pulses through each channel in accordance with said control pulses.

12. In a simultaneous well logging system, the combination of, first and second pulse detector channels, a common source of first radiation pulses of one polarity and second radiation pulses of the opposite polarity, means for supplying pulses from said source to both said channels, means in said first channel and responsive to the leading edge portions of said second radiation pulses for deriving a voltage the value of which is proportional to the rate of occurrence of said second radiation pulses, means in said second channel and responsive to the leading edge portions of said first radiation pulses for deriving a voltage the average value of which is proportional to the rate of occurrence of said first radiation pulses, and means included in each of said channels and controlled in accordance with the response of the opposite channel for blocking said channel, thereby to prevent the false response of each of said channels to pulses of the opposite type.

13. In a simultaneous well logging system the combination of, a common source of first radiation pulses of one polarity and second radiation pulses of the opposite polarity, a second radiation pulse detector channel, means for supplying pulses from said source to said channel, means included in said channel and responsive to pulses of said opposite polarity for deriving a voltage the average value of which is proportional to the rate of occurrence of said second radiation pulses, means for deriving control pulses from the leading edge portions of said first radiation pulses, and means controlled by said control pulses for blocking said second radiation pulse detector channel.

14. In a simultaneous well logging system, the combination of, a source of first radiation pulses of one polarity and second radiation pulses of the opposite polarity, first and second pulse channels, means for supplying pulses from said source to both of said channels, amplitude selection means included in each of said channels for selecting pulses of a predetermined polarity, and time selection means included in each channel and operative to prevent the selection of pulses therein for a predetermined time interval after the selection of a pulse in the opposite channel.

15. In a simultaneous well logging system, the combination of, a source of first radiation pulses of one polarity and second radiation pulses of the opposite polarity, first and second pulse detector channels, means for supplying pulses from said source to said first channel in one phase and to said second channel in the opposite phase, and combined amplitude and time selection means included in each of said channels for selecting pulses of a predetermined polarity while preventing the selection of any pulses for a predetermined time interval after the selection of a pulse in the opposite channel.

16. In a simultaneous well logging system, the combination of, a source of first radiation pulses of one polarity and second radiation pulses of the opposite polarity, first and second pulse detector channels, means for supplying pulses from said source to said first channel in one phase and to said second channel in the opposite phase, a one shot multivibrator included in each of said channels and adapted to respond only to pulses of a predetermined polarity, and a lockout circuit associated with the multivibrator of each of said channels and controlled by the multivibrator of the opposite channel for disabling the associated multivibrator for a predetermined time interval after each response of the multivibrator in the opposite channel.

17. In a simultaneous well logging system, the combination of, a source of first radiation pulses of one polarity and second radiation pulses of the opposite polarity, first and second pulse detector channels, means for supplying pulses from said source to said first channel in one phase and to said second channel in the opposite phase, a multivibrator included in each of said channels and having one tube thereof normally biased beyond cut-off, each of said multivibrators being adapted to respond only to pulses of a predetermined polarity, a condenser connected in the grid circuit of the biased tube of each of said multivibrators, means for charging the condenser in one of said channels in accordance with pulses from the multivibrator in the opposite channel, and means for discharging each of said condensers at a predetermined rate, whereby each of said multivibrators is disabled for a predetermined time interval after each response of the multivibrator in the opposite channel.

18. In a well logging system for simultaneously detecting radiations of two different types, the combination of first and second pulse detector channels, a common source of pulses of one polarity representing radiation of one type and pulses of the opposite polarity representing radiation of a different type, means for impressing pulses from said source on both said detector channels, first pulse responsive detector means in said first pulse detector channel and responsive to the leading edge portions of pulses of one polarity for deriving a signal which is proportional to the rate of occurrence of said pulses of one polarity, second pulse responsive detector means in said second pulse detector channel and responsive to the leading edge portions of pulses of the opposite polarity for deriving a signal which is proportional to the rate of occurrence of said pulses of opposite polarity, and pulse responsive blocking means included in each of said channels and controlled in accordance with the pulse response of the opposite channel for blocking each channel to prevent false responses in each of said channels due to pulses of the opposite type.

References Cited in the file of this patent

UNITED STATES PATENTS

| | | |
|---|---|---|
| 2,481,014 | Herzog | Sept. 6, 1949 |
| 2,483,394 | Barker | Oct. 4, 1949 |
| 2,495,826 | Schock | Jan. 31, 1950 |
| 2,504,888 | Siegert et al. | Apr. 18, 1950 |
| 2,536,228 | Ruysdael | Jan. 2, 1951 |
| 2,580,192 | Potter | Dec. 25, 1951 |
| 2,580,213 | Bess | Dec. 25, 1951 |
| 2,638,273 | Jensen et al. | May 12, 1953 |